Figure 1:
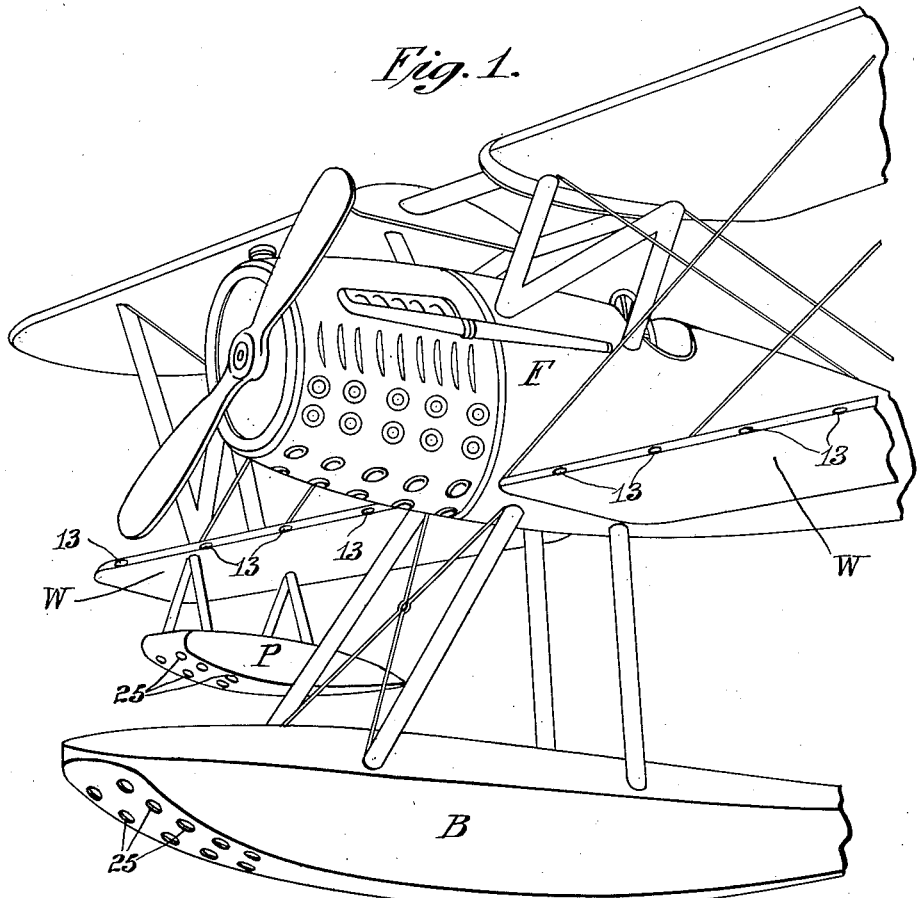

March 1, 1927. 1,619,100
M. T. BRUSH
AIRCRAFT
Filed Aug. 4, 1922 2 Sheets-Sheet 1

Mittie Taylor Brush
Inventor
By W. B. Whiting
Attorney

March 1, 1927.
M. T. BRUSH
AIRCRAFT
Filed Aug. 4, 1922
1,619,100
2 Sheets-Sheet 2
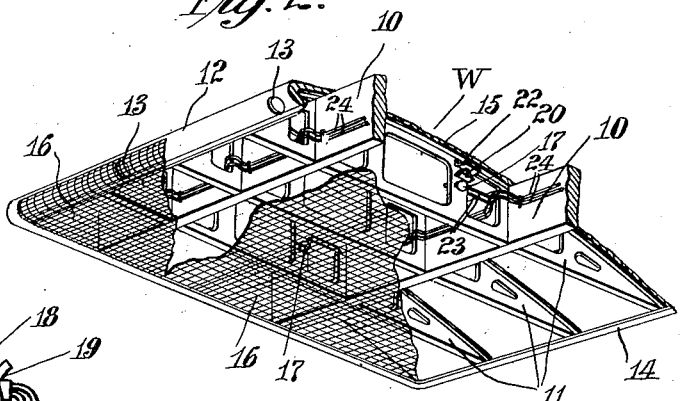
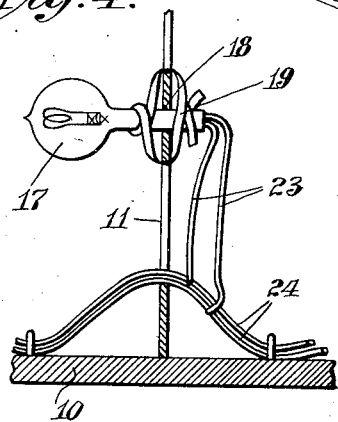
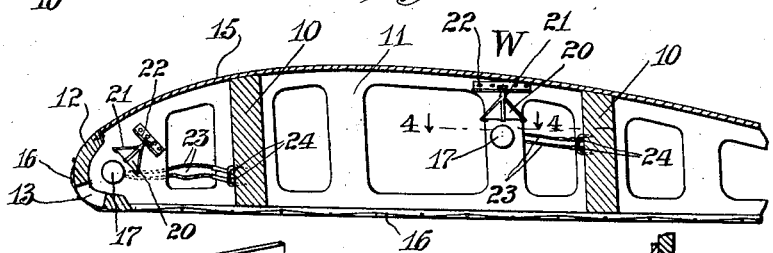
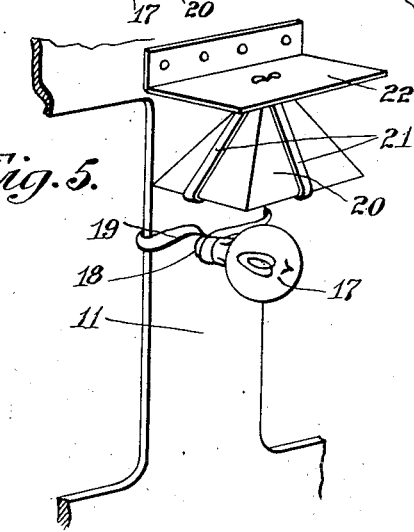
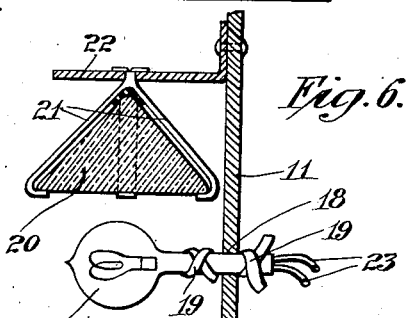
Millie Taylor Brush
INVENTOR
BY W. B. Whitney
ATTORNEY Patented Mar. 1, 1927.

1,619,100

UNITED STATES PATENT OFFICE.

MITTIE TAYLOR BRUSH, OF DUBLIN, NEW HAMPSHIRE.

AIRCRAFT.

Application filed August 4, 1922. Serial No. 579,570.

My present invention relates to aircraft, and the object thereof is to provide an aircraft with suitable means by which the operator or pilot can at night light up the space around him so that he can see objects therein, and more particularly so that he can see, at some considerable distance therefrom, the ground below and thereby be enabled to effect a landing in safety.

I attain this object by covering one or more of the enclosed parts of the machine, such for example as the wings and/or fuselage or pontoons of an airplane, either entirely or on the lower side only with a surfacing material which is transparent, or certain portions of which are transparent, and in mounting within such part or parts a plurality of electric lamps of suitable candle power which are under the control of the pilot and are provided with reflectors by which the rays of light therefrom are directed outwardly through the transparent portions of the surfacing material.

Any suitable transparent material may be used for the covering. I prefer for the purpose, however, a composite material comprising a woven or netted textile fabric of open, say one-quarter inch, mesh which is reinforced if desired with wire incorporated therein at intervals of one or two inches and a composition or dope known commercially as "celestrome" which is applied to the fabric and forms a tough transparent crystalline film covering and enveloping the threads and filling in the openings. This covering material may be made up in advance and attached to the framework of the wings of an airplane, usually only to the under side of the lower pair of wings, in the usual or in any suitable manner; or it may be conveniently applied by first attaching to the framework of the wings a coarse basketwork of fine tinned steel wires, then stretching upon and securing to the framework over the wire backing the netted textile fabric, and finally applying the dope to form the film which envelopes and binds together the threads of the fabric and the wires of the reinforcing backing. This same composite material may be used as a covering for the fuselage and/or pontoons of the airplane; but when it is desired to sheath such parts with wood or metal, circular or other openings can be formed in the covering and these openings can be filled in any suitable manner with pieces of the composite material or of glass.

The lamps employed are preferably small, although as now developed, they may be of quite high candle-power. For reflectors, glass prisms have been found very satisfactory and generally are recommended, but any suitable reflectors may be used. The lamps, and reflectors, are distributed through the interior of the wings and/or fuselage or pontoons as desired, being mounted upon or from the framework in any suitable manner. In the wings, a series of forward and downward openings are preferably also provided in the frame-piece which form the entering edge of the wing, and lamps and reflectors are mounted within or closely behind these openings, which may be covered over by extending the transparent covering of the lower surface up over this edge of the wing. The lamps may be wired in any suitable manner, the circuit wires being carried from the wings and/or pontoons into the fuselage where they are connected through switches with a battery or other source of electrical energy, different groups of lamps being preferably arranged in multiple on separate circuits so that they can be separately switched on or off by the pilot, as desired, making possible their use for signalling purposes.

The invention will be understood by reference to the accompanying drawings, in which—

Figure 7:
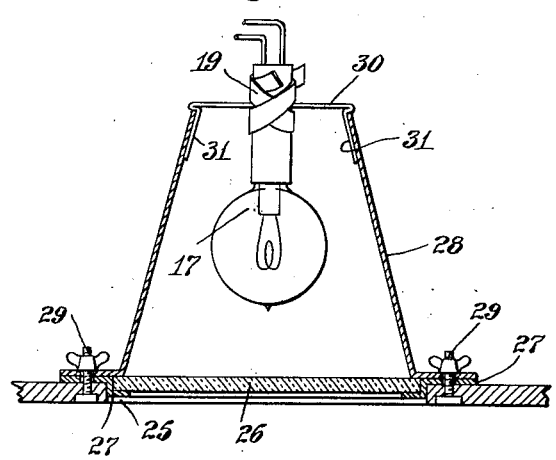
Figure 8:
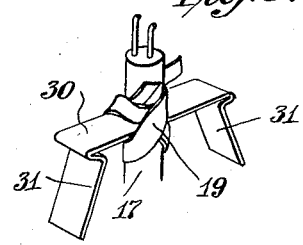

Figure 1 is a perspective view of a hydro-aeroplane, with parts broken away, showing its lower wings, fuselage, and central and side pontoons equipped with my new lighting system and illustrating different embodiments thereof appropriate to the different parts; Fig. 2, a similar view, on an enlarged scale, of a portion of one of the lower wings of the machine, with parts of the transparent surfacing material on its under side broken away; Fig. 3, a vertical transverse section through the wing; Figs. 4, 5, and 6, enlarged details, Fig. 4 being a section on the line 4, 4 of Fig. 3, showing a lamp and a prism reflector mounted upon a rib of the wing; Fig. 7, an enlarged detail showing, in cross section, a portion of the sheathing of the fuselage, or of a pontoon, at one of the openings therein, with a glass filling the opening and a lamp with a reflector mounted behind; and Fig. 8, a perspective view of certain of the parts shown in Fig. 7.

Referring to the drawings, F indicates the fuselage, W, W the lower pair of wings, B the central pontoon or boat body, and P one of the two side pontoons of the machine.

As here shown, the framework of each lower wing, comprising two spars 10, the usual series of fore and aft ribs 11, an entering edge-piece 12 having the openings 13 formed therein, and a trailing edge-piece 14, is covered on the upper surface with a sheet 15 of the usual or any suitable material and on its lower surface with a sheet 16 of the transparent composite covering described which is extended upwardly over the openings in the entering edge-piece. The electric lamps 17 are mounted by inserting the shank of each lamp in an opening 18 provided therefor in the web of a rib and securing it in place therein by means of a rubber tape 19. A glass prism reflector 20 is mounted in position above or behind each lamp by means of a spider 21, with spring claws which hook over the edges of the prism, secured to the under side of an angle plate 22, preferably of aluminum, which in turn is riveted or otherwise secured to the rib. The lamps are here arranged in two longitudinal series in each wing, one series with a lamp behind each of the openings in the entering edge-piece and the other series between the two spars; and the lamps of each series are preferably connected up in multiple by lead wires 23 connecting the terminals of each across two circuit wires 24 which are carried through the openings in the ribs and along one of the spars into the fuselage, where they are attached to a switchboard (not shown) conveniently located therein and by which they are connected with the source of electrical supply (not shown).

In the case of the fuselage and pontoons, each of the openings 25 in the forward portion of the lower sides thereof is closed by a piece of glass 26 mounted between one flange of a double flanged ring 27 and the flanged outer edge of the reflector 28 which are secured by bolts 29 or otherwise to the edge of the opening. The reflector here shown is conical in shape and is preferably made of aluminum polished and silvered on its inner surface. The shank of the lamp 17 is here secured, as in the wings, by a rubber tape 19 within an opening in a bridge-piece 30 which is removably secured to the inner end of the reflector by the spring arms 31 and thus holds the lamp in position. These lamps may also be connected up, in groups as desired, in multiple on circuit wires which in turn are connected to the switchboard within the fuselage, the circuit wires for such lamps as may be placed within the pontoons being carried up within or alongside of the struts, and in the case of the side pontoons thence within the wings, to the fuselage.

The lamps mounted within the different parts of the machine are, as stated, so connected with the switchboard that they can be turned off and on by the pilot in groups as desired, thus providing him with the means for night signalling.

The specific embodiments here shown and above described may, of course, be variously modified in their different details without departing from the principle or sacrificing any of the substantial advantages of the invention.

What I claim as new, and desire to secure by Letters Patent, is—

1. In an aircraft having an enclosed part, means for facilitating the handling of the same at night by lighting up the space outside, comprising a transparent surfacing material for said enclosed part and a plurality of incandescent electric lamps controllable by the pilot which are distributed within said enclosed part and are provided with reflectors adapted to reflect the light therefrom outwardly through the surfacing material.

2. In an airplane, means for lighting up at night the space below comprising wings which on their lower sides are covered with a transparent surfacing material and a plurality of incandescent electric lamps controllable by the pilot from the body of the airplane which are distributed about within the wings above, and are provided with reflectors adapted to reflect the light therefrom downwardly through, such lower surfacing material.

3. An airplane having wings which on their lower sides are covered with a surfacing material comprising an open-meshed textile fabric and applied thereto a composition forming a transparent crystalline sheet filling and covering the fabric, and a plurality of incandescent electric lamps controllable from the body of the airplane which are distributed about within the wings above, and are provided each with a reflector adapted to direct the light therefrom downwardly through, the transparent lower surfacing material.

4. An airplane having a pair of wings which are covered in part at least along their entering edge and on the lower surface with a transparent surfacing material and a plurality of electric lamps of relatively small candle power, controllable from the body of the airplane, which are mounted within the wings and are provided with reflectors adapted to direct the rays of light from certain of the lamps forwardly through the transparent surfacing material along the entering edge and of other lamps downwardly through the surfacing material on the lower surface.

5. An airplane having a wing provided with a series of forward and downward openings in that part of its framework which forms the entering edge, coverings of transparent material for said openings, a transparent surfacing material covering the lower side of the wing, and a plurality of electric lamps of relatively small candle power backed by prism glass reflectors which are mounted within the wing, a series of lamps behind the openings in the entering edge and the remaining lamps distributed through the body of the wing, and are controllable from the body of the airplane.

MITTIE TAYLOR BRUSH.